United States Patent [19]

Howett

[11] Patent Number: 4,661,977

[45] Date of Patent: Apr. 28, 1987

[54] TELEPHONE

[75] Inventor: Frederick J. Howett, Barnet, England

[73] Assignee: STC, plc, London, England

[21] Appl. No.: 807,660

[22] Filed: Dec. 11, 1985

[30] Foreign Application Priority Data

Dec. 15, 1984 [GB] United Kingdom ................ 8431708

[51] Int. Cl.$^4$ ............................................ H04M 1/27
[52] U.S. Cl. ..................................... 379/355; 379/216
[58] Field of Search ............... 179/90 B, 90 R, 90 BB, 179/90 BD, 90 CS, 18 BA, 18 AD

[56] References Cited

U.S. PATENT DOCUMENTS 4,567,326 1/1986 Sato et al. ........................ 179/90 B
4,571,463 2/1986 Shefler ............................. 179/90 B

FOREIGN PATENT DOCUMENTS 1446024 8/1976 United Kingdom .

Primary Examiner—James L. Dwyer
Attorney, Agent, or Firm—Kerkham, Stowell, Kondracki, & Clarke

[57] ABSTRACT

In a telephone with repertory dialling and redial (which includes repeat last number), when dialling out from a PABX, one emits an access code and then the wanted number. The access code causes the sender to pause for a second dial tone before continuing to send. When dialling manually the user pauses and listens for the second dial tone, so that in the redial case no access pause code appears in the redial store. In the present system of the first digit is an access code, the digit sender checks the repertory dialler for an access pause code, and if it finds one there, it inserts such a pause in the dialled out number.

1 Claim, 2 Drawing Figures

TELEPHONE

BACKGROUND OF THE INVENTION

This invention relates to repertory diallers, such as used in telephone subscriber's instruments. It should be noted that the term dialler as used herein is intended to cover wanted digit sending in response to push-button operation as well as in response to the operation of the rather older-established rotatable dial.

In some cases while dialling a wanted number, one receives an additional dial tone during number sending. When this occurs when dialling manually, after dialling a first portion of the number, it is necessary to await the next dial tone and then continue dialling. A common circumstance in which this occurs is when "dialling out" from a PABX to another PABX, or to the public switched telephone network (PSTN).

When dialling out from a PABX it is necessary to dial an access code and then await the second dial tone before sending the rest of the wanted number. Many repertory diallers currently in use permit the storage of access pause codes, i.e. codes which define access pauses, as part of the stored number. An example of this is described in our British Pat. No. 1446024 (A.C. Beadle et al 33-13). In the arrangement described herein the pause, which may be of fixed or variable duration, is inserted at the correct position when dialling out from the repertory store, to ensure reception of the second dial tone before continuing with the dialling sequence. In the above-quoted Patent, the pause is variable since a dial tone detector checks for the presence of the second dial tone and permits completion of the dialling in response to reception thereof.

However, when the subscriber makes a call to the PSTN via a PABX, he does not normally key or otherwise send an access pause code: the pause is generated naturally by listening for the second dial tone before continuing with the signalling. If this number is then retained for redial or repeat of the last number (RLN) usage, it does not contain the required access pause code.

One way to overcome this problem which is currently used is for the subscriber to dial (or key in) the access code digit manually, wait for the second dial tone and then, after the remainder of the number has been dialled, operate the redial or RLN facility. Special circuitry ensures that any digits corresponding to manually dialled access code digits are removed from the stored number before it is signalled to the PSTN. This involves a degree of complication due to the special circuitry referred to above. An object of the invention is to provide an improved and less complicated solution to the access pause code problem.

SUMMARY OF THE INVENTION

According to the invention, there is provided a telephone subscriber's instrument, which has a repertory dial facility with storage means for regularly-used numbers and a repeat-last-number-dialled (redial) facility, which last-mentioned facility provision includes a further storage means into which a number is written when dialled, wherein:

when the instrument is in use the numbers stored in the repertory dial store include at least one number with an access pause code at a defined position in that number at which a further dial tone may be received;

when a wanted number for which an access pause code is needed is sent from the instrument by the use of the redial facility control means, checks the numbers in the repertory dialler stores to see if any such number has an access pause code, which said control means performs such a check by examining the digit codes stored for the numbers in the repertory dialler store in search of a said pause code;

the results of said check by the control means is applied to the circuitry used to provide the redial facility; and as a result of said application the digit sending for redial is interrupted at a point defined by the said access pause code detection, so that an access pause is inserted into the number as sent by the redial facility at the appropriate position, digit sending then being resumed when a said further dial tone is received and detected.

It should be noted that the term redial as used herein and in the claims is intended to include the repeat last number (RLN) facility.

BRIEF DESCRIPTION OF THE DRAWINGS

An embodiment of the invention will now be described with reference to the accompanying drawings, in which.

DESCRIPTION OF A PREFERRED EMBODIMENT

The concept on which the arrangement is based is that if the number in the redial store needs an access pause, as indicated by the number of digits in the number, or by the identity of the first digit, control means checks whether any of the numbers stored in the repertory dialler stores include access code indication. This, of course, assumes that the block of numbers in the repertory dialler stores includes at least one "outside" number which is regularly used. In the vast majority of cases in which a PABX line is served by a repertory dialler this will apply. In fact when an instrument embodying the invention is supplied to a customer, the instructions for its use would indicate that at least one such number is placed in the repertory dialler store.

If the check by this control means reveals that the numbers in the repertory dialler store include at least one with an access code then the redial facility inserts an access pause into the dialling sequence in the same position as that at which in the repertory store an access pause code was detected in the repertory dialler store. Such a check involves the control means examining the digits in the repertory dialler store for the code used to represent the access pause. The point at which it is found "tells" the control means where an access pause should be introduced. Hence the operation of the redial facility and of the repertory dialler facility are effectively the same, whether the telephone is used behind a PABX or on a direct exchange line.

The operation of the system whereby this is achieved can be effected using hardware, but it would be more likely to be done using software in a microprocessor memory.

Figure 1:
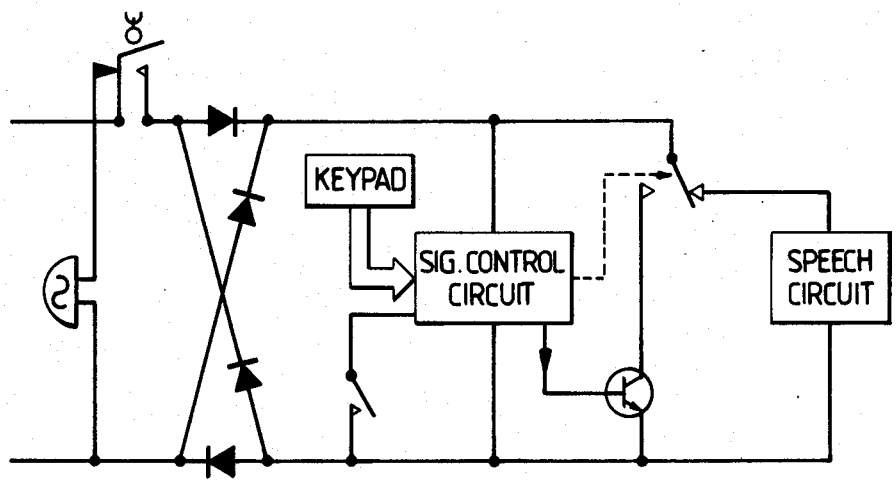
FIG. 1 is a simplified schematic of a telephone subscriber's circuit embodying the invention.

FIG. 1 shows schematically a telephone subscriber's instrument circuit to which the invention is applicable. Much of this figure is self-explanatory to one skilled in the art, but a brief description of the Signal Control Circuit block follows. This block includes a repertory dialler store which has the capacity for a number of regularly-called numbers, each located at an address in the store individual thereto. Thus if the store can accommodate 48 such numbers, as is the case for one existing system, each such number is defined by an address which consists of two decimal digits. Thus, for instance, the digit code 13 may define the national patent office, while the digit code 39 may define the local income tax office.

Each such memory address can accommodate a multi-digit number which may include an access pause code. Thus when the telephone instrument is connected to a PABX, a much-called number in the repertory dialler store starts with the code, e.g. 9, by which a caller accesses the public exchange, then a pause code, and then the rest of the number. When such a number is called via the repertory dialler, the latter emits the exchange access code, notes the access pause code and as a result waits until another dial tone arrives. This latter is detected by a dial tone detector, which then causes the sending of the rest of the number.

The Signal Control Circuit also includes another multi-digit store for a number which has been dialled previously. If the caller has met a busy tone, the use of this redial facility enables the wanted number to be sent as often as needed to set up a connection to that number, without the subscriber having to redial. Thus it can supply a "camp-on busy" facility, or be used to make several successive calls to the same number.

Figure 2:
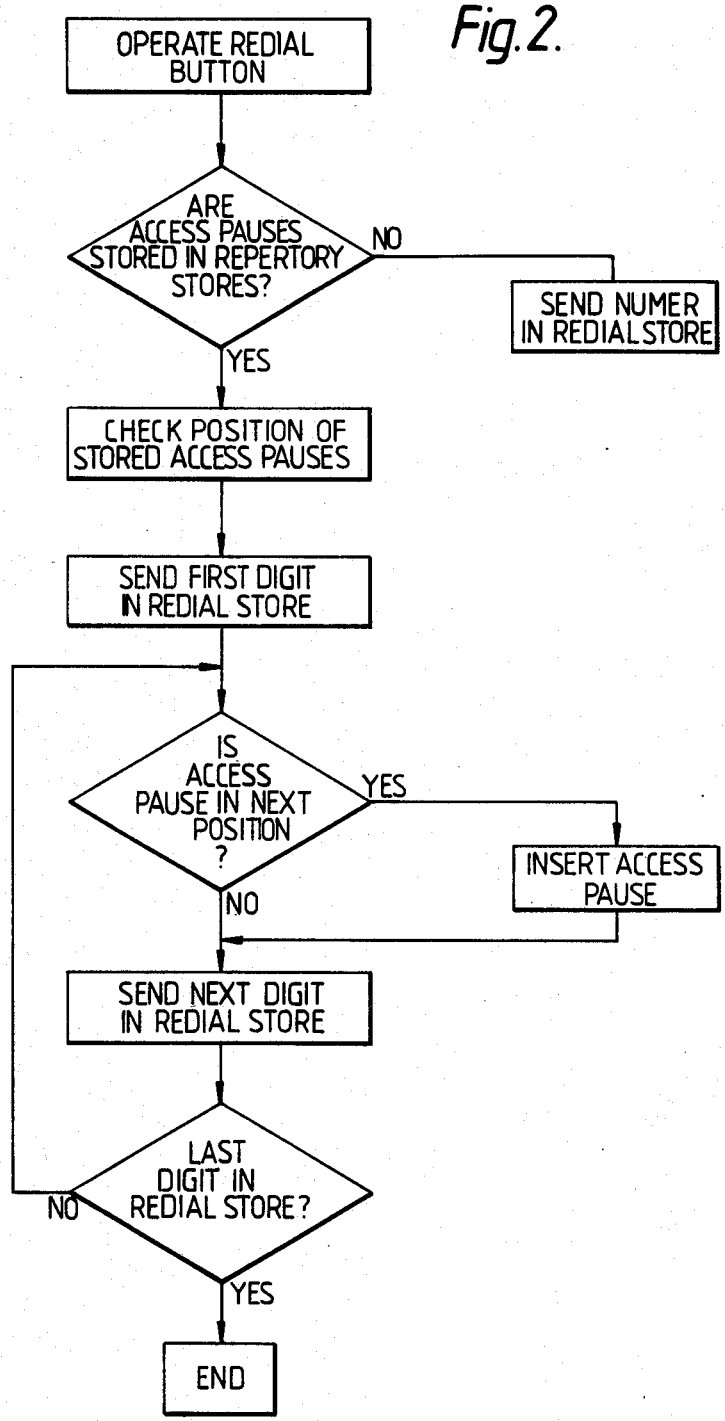
FIG. 2 is a flow diagram for operations where the first digit to be dialled may be an access code to obtain access to a PSTN or another PABX.

In view of the above description it is felt that the flow diagram, FIG. 2, is reasonably clear.

As an example we have the following:

| (a) | Number in repertory store | 9A2465000 |
|---|---|---|
| (b) | Number in redial store | 93681234 |
| (c) | Redialled number | 9A3681234 |

The first number quoted here is one of the telephone user's regularly-used numbers, and as placed in the repertory store it includes an access pause code digit A after the digit 9. This last digit is the one whereby the user has access to the PSTN (or another PABX).

The number in the redial store arrived there when the user dialled; as he did not dial an access pause digit, no digit A is preset therein.

When a number is to be redialled, the control means "notices" that the first digit is 9, which gives access to the PSTN. Its check of the numbers in the repertory dialler store shows that a number starting with 9 must have an access pause after that 9. Hence it causes the redialler to stop and wait for another dial tone before it resumes digit sending.

It should be noted that there may well be two or more different access codes, e.g. 9 for local calls only and 8 for calls to more remote exchanges. Further, the access code may include two or more digits.

I claim:

1. A telephone subscriber's instrument, which has a repertory dial facility with storage means for regularly-used numbers and a repeat-last-number-dialled (redial) facility, which last-mentioned facility provision includes a further storage means into which a number is written when dialled, wherein:

when the instrument is in use the numbers stored in the repertory dial store include at least one number with an access pause code at a defined position in that number at which a further dial tone may be received;

when a wanted number for which an access pause code is needed is sent from the instrument by the use of the redial facilitate control means checks the numbers in the repertory dialler stores to see if any such number has an access pause code, which said control means performs such a check by examining the digit codes stored for the numbers in the repertory dialler store in search of a said pause code;

the result of said check by the control means is applied to the circuitry used to provide the redial facility; and as a result of said application the digit sending for redial is interrupted at a point defined by the said access pause code detection, so that an access pause is inserted into the number as sent by the redial facility at the appropriate position, digit sending then being resumed when a said further dial tone is received and detected.

* * * * *